US012628847B2

(12) United States Patent
Kim et al.

(10) Patent No.: US 12,628,847 B2
(45) Date of Patent: May 19, 2026

(54) GLUTEN-FREE DOUGH COMPOSITION FOR CONFECTIONARY AND USE THEREOF

(71) Applicant: CJ CHEILJEDANG CORPORATION, Seoul (KR)

(72) Inventors: Ah Jin Kim, Suwon-si (KR); Son Woo Kim, Suwon-si (KR); Ki Moon Kang, Suwon-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 565 days.

(21) Appl. No.: 18/007,905

(22) PCT Filed: Jun. 2, 2021

(86) PCT No.: PCT/KR2021/006841
    § 371 (c)(1),
    (2) Date: Dec. 2, 2022

(87) PCT Pub. No.: WO2021/246768
    PCT Pub. Date: Dec. 9, 2021

(65) Prior Publication Data
    US 2023/0225352 A1      Jul. 20, 2023

(30) Foreign Application Priority Data

Jun. 3, 2020    (KR) ........................ 10-2020-0067261

(51) Int. Cl.
    *A23G 3/44*      (2006.01)
    *A23G 3/42*      (2006.01)
    *A23G 3/48*      (2006.01)
(52) U.S. Cl.
    CPC ................. *A23G 3/44* (2013.01); *A23G 3/42* (2013.01); *A23G 3/48* (2013.01)
(58) Field of Classification Search
    None
    See application file for complete search history.

(56) References Cited

U.S. PATENT DOCUMENTS

| | | | |
|---|---|---|---|
| 2005/0181113 A1 | 8/2005 | Bodor | |
| 2010/0227040 A1 | 9/2010 | Muraoka et al. | |
| 2013/0129881 A1 | 5/2013 | Reuscher et al. | |
| 2014/0370178 A1* | 12/2014 | Boursier | A21D 8/06 |
| | | | 426/549 |
| 2015/0374000 A1 | 12/2015 | Sato et al. | |
| 2020/0178545 A1 | 6/2020 | Osmanoglou et al. | |

FOREIGN PATENT DOCUMENTS

| | | | |
|---|---|---|---|
| JP | H11-103824 A | | 4/1999 |
| JP | 2004180516 A | * | 7/2004 |
| JP | 2004-298179 A | | 10/2004 |
| JP | 6448110 B2 | | 1/2019 |
| JP | 6484445 B2 | | 3/2019 |
| KR | 10-2007-0001950 A | | 1/2007 |
| KR | 10-2014-0096122 A | | 8/2014 |
| KR | 10-2015-0074724 A | | 7/2015 |
| KR | 10-1993269 B1 | | 6/2019 |
| KR | 10-2223375 B1 | | 3/2021 |
| WO | 2007/114129 A1 | | 10/2007 |
| WO | 2008123098 A1 | | 10/2008 |
| WO | 2018236219 A1 | | 12/2018 |

OTHER PUBLICATIONS

"Mugwort Fig Soybean Cookies-Low Carb, High Protein, Whole Wheat Flour, Gluten Free," <<http://sgfree.kr >> (Oct. 11, 2019) (see English abstract).
International Search Report issued in corresponding International Patent Application No. PCT/KR2021/006841 dated Sep. 6, 2021.

* cited by examiner

*Primary Examiner* — Jyoti Chawla
(74) *Attorney, Agent, or Firm* — Morgan, Lewis & Bockius LLP

(57) ABSTRACT

The present application relates to a dough composition for confectionery and the use thereof, wherein the dough composition for confectionery includes vegetable protein, animal protein, and a dietary fiber.

12 Claims, 1 Drawing Sheet

【Fig. 1】
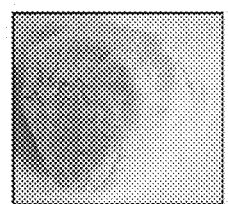 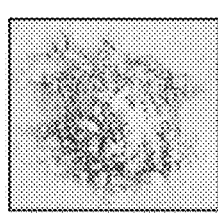 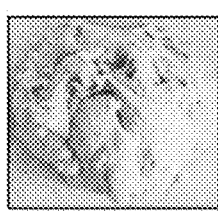 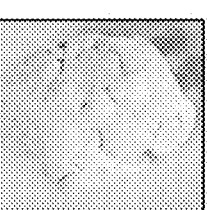
Comparative
Example 1
Comparative
Example 2
Comparative
Example 3
Example 1
【Fig. 2】
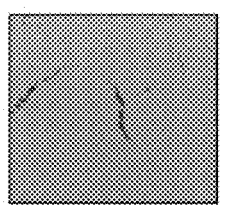 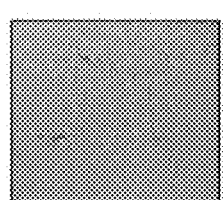 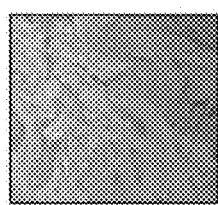 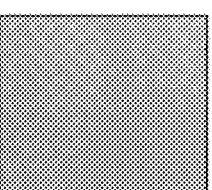
Comparative
Example 1
Comparative
Example 2
Comparative
Example 3
Example 1
【Fig. 3】
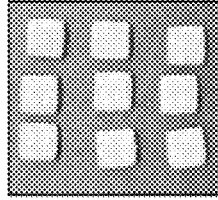 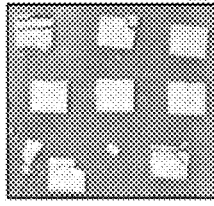 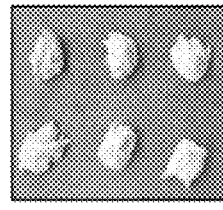 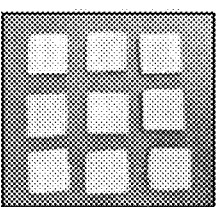
Comparative
Example 1
Comparative
Example 2
Comparative
Example 3
Example 1

GLUTEN-FREE DOUGH COMPOSITION FOR CONFECTIONARY AND USE THEREOF

TECHNICAL FIELD

The present application relates to a composition for preparing dough for confectionery, and the use thereof.

BACKGROUND ART

Generally, a confectionery product such as biscuits, sables, crackers and shortbreads uses wheat flour as a main ingredient of dough, and the properties of gluten contained in the wheat flour imparts viscoelasticity and firmness to dough for confectionery. However, there have been issues constantly being raised in that an excessive intake of gluten causes celiac disease, non-celiac gluten sensitivity, wheat allergy, and the like, thereby adversely affecting health, and causes obesity.

Accordingly, as interest in gluten-free and protein-fortified foods has recently increased, products not containing wheat flour are being released. However, most of the products are either foods in which only gluten is replaced using alpha-gelatinized starch, enzyme-treated protein, or the like and not having a high protein content, or high-protein foods containing gluten. In addition, when only protein is blended into dough, the texture a product is poor compared to cookies made from wheat flour, and since the protein absorbs moisture, the dough becomes thick, and thus, tends to be broken and stuck to a tool, thereby causing a problem in molding (WO2007-114129 A).

Under this background, the present inventors have made research efforts to develop a method capable of increasing the viscoelasticity and moldability of dough without adding wheat flour or gluten and maintaining the shape of a prepared confectionery product. As a result, the present inventors have prepared dough having the above-described effects by including vegetable protein, animal protein, and a dietary fiber and mixing the same at a specific ratio to adjust the viscoelasticity of the dough, and have completed the present invention by confirming that not only the shape of a confectionery product according to the present invention is maintained but also the texture and sensory thereof are excellent even through starch or gluten is not used.

DISCLOSURE OF THE INVENTION

Technical Problem

An object of the present application is to provide a dough composition for confectionery not containing gluten.

Another object of the present application is to provide a method for preparing dough for confectionery not using gluten.

Yet another object of the present application is to provide a confectionery product not including starch or gluten, but containing protein and a dietary fiber in a high content.

Technical Solution

In order to archive the above objects, an aspect of the present application provides a dough composition for confectionery which includes vegetable protein including soy protein, animal protein including milk protein and egg protein, and a dietary fiber.

The dough composition for confectionery of the present application may not include gluten.

The gluten refers to a protein complex found in triticeae tribe grain including wheat, barley and rye. The dough composition for confectionery of the present application is characterized in that when preparing dough, wheat flour is not used at all, but instead, vegetable protein and animal protein are used at a specific ratio and a dietary fiber is mixed with protein at a specific ratio to prepare the dough. The dough composition for confectionery of the present application includes vegetable protein including soy protein. The vegetable protein is protein derived from vegetables, and includes, but is not limited to, for example, soy protein, grain protein, nut protein, and the like.

The soy protein includes, for example, protein extracted from soybeans, peas, chickpeas, fava beans, lentils, and the like, and more specifically, may be soybean protein, even more specifically, soybean protein concentrate.

The grain protein is protein derived from grain, and may include, but is not limited to, protein extracted from grain such as rice, oat, quinoa, and the like, and may not include gluten protein extracted from grain such as wheat, barley, and the like.

The nut protein is protein derived from nuts, and may include, but is not limited to, protein extracted from nuts such as almonds, pumpkin seeds, chia seeds, sacha inchi, hemp seeds, and the like. The vegetable protein may be suitably selected in accordance with the properties of a desired confection.

In the present application, the vegetable protein may impart binding force, stretchiness, and elasticity to dough for confectionery.

The dough composition for confectionery of the present application includes animal protein including milk protein. The animal protein refers to protein derived from meat, seafood, eggs, milk, cheese, and the like, and specifically, may be milk protein and egg protein.

The milk protein is protein separated from milk, and includes, but is not limited to, for example, milk protein concentrate (MPC), milk protein isolate (MPI), milk protein hydrolysate (MPH), whey protein concentrate (WPC), whey protein isolate (WPI), whey protein hydrolysate (WPH), caseins protein (CP), and the like.

The egg protein may be protein included in, for example, whole eggs, yolks, and egg whites, and specifically, may include ovalbumin contained in egg whites, and lecithin contained in egg yolks.

In the present application, the milk protein may improve the stability of the dough for confectionery by emulsifying force, and the egg protein may impart binding force and emulsifying force to the dough, and may impart stability against heat and acids thereto.

The dough composition for confectionery of the present application may include a dietary fiber. More specifically, a dietary fiber including a water-soluble dietary fiber and a water-insoluble dietary fiber may be included.

The water-soluble dietary fiber includes, but is not limited to, for example, a chicory dietary fiber, fructooligosaccharide, indigestible dextrin, polydextrose, galactooligosaccharide, and the like, and the water-insoluble dietary fiber includes, but is not limited to, for example, a soybean dietary fiber, a prune dietary fiber, a rice dietary fiber, an oat dietary fiber, and the like.

In the present application, the dietary fiber imparts water retaining force to the dough for confectionery.

In one embodiment, in the dough composition for confectionery of the present application, the total protein including the vegetable protein and the animal protein may be included in 100 to 300 parts by weight, specifically 100 to 290 parts by weight, 100 to 280 parts by weight based on 100 parts by weight of the dietary fiber. The upper limit of the content of the total protein may be 300 parts by weight, 250 parts by weight, 230 parts by weight, 220 parts by weight, 210 parts by weight, or 200 parts by weight, and the lower limit thereof may be 100 parts by weight, 110 parts by weight, 120 parts by weight, 130 parts by weight, 140 parts by weight, or 150 parts by weight.

Even more specifically, the total protein including the vegetable protein and the animal protein may be included in 100 to 270 parts by weight, 100 to 260 parts by weight, 100 to 250 parts by weight, 100 to 240 parts by weight, 100 to 230 parts by weight, 100 to 220 parts by weight, 100 to 210 parts by weight, 100 to 200 parts by weight, 150 to 300 parts by weight, or 150 to 250 parts by weight of the dietary fiber. More specifically, the total protein may be included in 120 to 250 parts by weight, 120 to 230 parts by weight, 120 to 220 parts by weight, 120 to 210 parts by weight, or 120 to 200 parts by weight of the dietary fiber. That is, when the ratio of the total protein and the dietary fiber is expressed in a weight ratio, the weight ratio of the total protein and the dietary fiber may be 1:1 to 3:1, more specifically 2.4 to 3.5:1.5 to 2.5. In the present application, the blending content as well as the composition of each component are very important when it comes to a composition for confectionery. When protein and a dietary fiber are included in the above weight ratio, the binding force, emulsifying force, stretchiness, and elasticity of the protein and the water retaining force of the dietary fiber are balanced, and thus, may increase the stability of dough, impart binding force thereto, and increase the elasticity thereof.

In one embodiment, in the dough composition for confectionery of the present application, the vegetable protein, more specifically soy protein, even more specifically soybean protein, may be included in 10 to 150 parts by weight based on 100 parts by weight of the dietary fiber. More specifically, the upper limit be 150 parts by weight, 140 parts by weight, 130 parts by weight, or 120 parts by weight, and the lower limit may be 10 parts by weight, 15 parts by weight, 20 parts by weight, 25 parts by weight, or 30 parts by weight. More specifically, the vegetable protein may be included in 10 to 140 parts by weight, or 15 to 130 parts by weight. In addition, the vegetable protein, more specifically soy protein, even more specifically soybean protein, may be included in 10 to 80 parts by weight based on 100 parts by weight of the total protein. More specifically, the upper limit may be 80 parts by weight, 75 parts by weight, or 70 parts by weight, and the lower limit may be 10 parts by weight, 15 parts by weight, or 20 parts by weight. More specifically, the vegetable protein may be included in 10 to 75 parts by weight, 10 to 70 parts by weight, 15 to 75 parts by weight, 15 to 70 parts by weight, or 20 to 70 parts by weight. When the vegetable protein is included in the above range, the rate of moisture absorption by the vegetable protein is controlled, so that an appropriate amount of moisture may be contained in the dough, so that the moldability of the dough may be improved.

In one embodiment, in the dough composition for confectionery of the present application, the content of the animal protein, more specifically the content of milk protein, may be 20 to 150 parts by weight based on 100 parts by weight of the total protein. More specifically, the upper limit may be 150 parts by weight, 140 parts by weight, 130 parts by weight, 120 parts by weight, 100 parts by weight, or 90 parts by weight, and the lower limit may be 20 parts by weight, 25 parts by weight, or 30 parts by weight. More specifically, the animal protein may be included in 20 to 130 parts by weight, 20 to 100 parts by weight, or 20 to 90 parts by weight. When the animal protein is included in the above range, the stability of the dough is increased, binding force is imparted to the dough, and prepared cookies may not be broken, maintaining the shape thereof.

In one embodiment of the present application, based on 100 parts by weight of the dough composition for confectionery, the vegetable protein including soy protein may be included in 3 to 40 parts by weight, more specifically 5 to 30 parts by weight, even more specifically 5 to 25 parts by weight. In addition, the content of animal protein including milk protein, more specifically the content of milk protein, may be 5 to 50 parts by weight, more specifically 8 to 45 parts by weight, 10 to 45 parts by weight, or 13 to 43 parts by weight, and even more specifically 15 to 40 parts by weight. In addition, egg protein may be included in 1 to 5 parts by weight, more specifically 1 to 3 parts by weight. In addition, the dietary fiber may be included in 10 to 50 parts by weight, more specifically 10 to 45 parts by weight, and even more specifically 10 to 40 parts by weight.

When the above components are included, dough for confectionery prepared using the components is imparted with viscoelasticity without the addition of wheat flour and/or gluten, so that the moldability thereof is excellent. Cookies prepared using the dough are not broken, thereby maintaining the shape thereof, and have a high content of protein and a dietary fiber as well as excellent texture. In the present application, a confectionery product may refer to both 'confectionery' and 'a confection,' but is not particularly limited thereto. Any confectionery provided by baking dough may be included. For example, the confectionery product may include all of cakes, cookies, pies, breads, and confections, and may specifically be a baked confection. In the present application, the baked confection refers to a confection prepared by baking dough, and the dough composition for confectionery of the present application may be for preparing one or more baked confections selected from the group consisting of biscuits, cookies, crackers, dry breads, pretzels, wafers, pies, cut breads, shortbreads, sables, langue de chats, and macaroons.

The dough composition for confectionery of the present application may additionally contain fat and oils and sugars according to the nature and purpose of a desired confection.

In the present application, as long as the sugars are used in a confectionery field, the type thereof is not limited. The sugars may be composed of one or more selected from the group consisting of sugar, oligosaccharide, starch syrup, honey, fructose, lactose, dextrin, maltose, trehalose, stevioside, aspartame, sorbitol, xylitol, mannitol, and inositol. In the dough composition for confectionery of the present application, the content of the sugars may be appropriately adjusted according to preference, and the sugars may be included in 1 to 10 parts by weight, 3 to 10 parts by weight, or 5 to 10 parts by weight based on 100 parts by weight of the composition.

In the present application, as long as the fat and oils are used in a confectionery field, the type thereof is not limited. For example, the fat and oils may include a liquid fat and oil selected from soybean oil, grape seed oil, sunflower seed oil, olive oil, corn oil, rapeseed oil, evening primrose oil, palm oil, pepper seed oil, and palm oil, or may be a solid fat and oil selected from butter, margarine, and shortening. In the dough composition for confectionery of the present application, the content of the fat and oils may be appropriately adjusted according to the type of a confectionery product, and the fat and oils may be included in 10 to 20 parts by weight, 12 to 18 parts by weight, or 10 to 15 parts by weight based on 100 parts by weight of the composition.

Various additional ingredients components may be included in the dough composition for confectionery of the present application according to preference. For example, one or more additional components selected from the group consisting of refined salt, flavorings, food coloring, cheese, baking powder, chocolate, milk, caramel, cream, and jam may additionally be included according to the type of a finally prepared confectionery product and the taste of a consumer. However, the present application is not limited thereto. The addition amount of the additional components may be appropriately adjusted according to preference. For example, the dough composition for confectionery may include 0 to 15 parts by weight of refined salt based on 100 parts by weight of the composition.

According to another aspect, the present application provides a method for producing a confectionery product, the method including kneading dough by mixing a dough composition for confectionery containing 3 to 40 parts by weight of soy protein, 5 to 50 parts by weight of milk protein, 5 to 20 parts by weight of a whole egg solution, and 10 to 50 parts by weight of the dietary fiber, and baking the dough. In the method for producing a confectionery product of the present application, the dough composition for confectionery may be for producing one or more confectionery products selected from the group consisting of biscuits, cookies, crackers, dry breads, pretzels, wafers, pies, cut breads, shortbreads, sables, langue de chats, and macaroons.

The dough composition for confectionery may contain additional components according on the nature and purpose of a desired confection, and the contents of the additional components may also be changed according to the nature and purpose of a confection. According to an example, the dough composition for confectionery may be mixed with 10 to 20 parts by weight of a solid fat and oil, 1 to 10 parts by weight of sugars, 0.1 to 0.5 parts by weight of salt, and purified water to knead dough.

The step of baking the dough may be changed according to the nature and purpose of a desired confection. For example, the baking may be performed for 10 to 40 minutes at 140 to 230° C., or may be performed by applying different temperature conditions to upper and lower portions. For example, the baking may be performed for 10 to 40 minutes at 100 to 150° C. for the lower portion and at 160 to 230° C. for the upper portion.

The soy protein, milk protein, a dietary fiber, solid fat and oil, sugars and salt are the same as described above.

In the method for producing a confectionery product of the present application, a whole egg solution may be used as the egg protein. In the present specification, the whole egg solution means all of an egg except for the shell thereof. Eggs distributed and sold with 100% of egg yolk and egg white may be used.

The whole egg solution may be included in an amount of 5 to 20 parts by weight, more specifically 9 to 15 parts by weight, based on 100 parts by weight of the composition. When the whole egg solution is included in the above range, the content of egg protein in the whole egg solution may be 1 to 5 parts by weight, more specifically 1 to 3 parts by weight.

According to another aspect, the present application provides a confectionery product containing 15 g/100 g to 40 g/100 g of crude protein and 10 g/100 g to 40 g/100 g of a dietary fiber, and having a gluten content of 0.5 mg/100 g or less.

In one specific embodiment of the present application, the confectionery product according to the present invention may be a high-protein, high-dietary fiber confectionery product not containing gluten. More specifically, per 100 g of solids of the confectionery product, the content of crude protein in the confectionery product may be 15 to 40 g, more specifically 20 to 40 g, or 20 to 35 g, and the content of a dietary fiber therein may be 8 to 40 g, more specifically 10 to 40 g, or 20 to 30 g.

In addition, the content of the crude protein in the confectionery product may be 80 to 170 parts by weight, more specifically 85 to 165 parts by weight, 85 to 150 parts by weight, 85 to 140 parts by weight, 90 to 130 parts by weight, or 90 to 120 parts by weight based on 100 parts by weight of the dietary fiber.

In one specific embodiment of the present application, gluten-free means that constituent components do not include wheat flour or a gluten component, and the content of gluten in the confectionery product may be 0.5 mg/100 g or less in a measurable range, which is a quantitative limit when preforming analysis.

In one specific embodiment of the present application, the confectionery product may include vegetable protein including soy protein and animal protein including milk protein.

In one specific embodiment of the present application, the confectionery product may include a dietary fiber, and more specifically, a dietary fiber including a water-soluble dietary fiber and a water-insoluble dietary fiber.

The water-soluble dietary fiber includes, but is not limited to, for example, a chicory dietary fiber, fructooligosaccharide, indigestible dextrin, polydextrose, galactooligosaccharide, and the like, and the water-insoluble dietary fiber includes, but is not limited to, for example, a soybean dietary fiber, a prune dietary fiber, a rice dietary fiber, an oat dietary fiber, and the like.

When a confectionery product has components and contents as described above, the confectionery product may maintain the shape thereof without being broken, and may have a balanced texture of crispness and moistness.

In addition, per 100 g of solids of the confectionery product, the content of carbohydrates in the confectionery product may be 20 to 50 g, more specifically 30 to 50 g, or 30 to 40 g, and the content of sugars therein may be 3 to 20 g, more specifically 5 to 20 g, or 10 to 15 g.

Constituent components of the confectionery product according to the present invention may be blended without particular limitation as long as they are constituent components commonly blended in confectionery products. In addition, the blending amounts thereof may not be particularly limited as long as they are within a range in which constituent components are commonly blended in confectionery products. Specifically, examples thereof may include water, sugar alcohol, starch, table salt, plastic fat and oil, an emulsifier, an emulsifying foaming agent (emulsifying fat and oil), cheese, fresh cream, synthetic cream, yogurt, whole milk powder, skim milk powder, milk, condensed milk, synthetic milk, yeast, yeast foods, cacao mass, cocoa powder, chocolate, coffee, black tea, matcha, vegetables, fruits, fruit, nectar, jam, fruit sauce, meat, seafood, beans, bean flour, tofu, soybean milk, soybean powder, soybean protein, swelling agents, sweeteners, seasonings, spices, color additives, flavorings, and the like.

The confectionery product of the present invention may be produced under known production conditions and by known production methods, other than using the constituent components included in the dough composition for confectionery according to the present invention.

In the present application, a confectionery product may refer to both 'confectionery' and 'a confection,' but is not particularly limited thereto. Any confectionery provided by baking dough may be included. Specific examples of the confectionery product of the present application may include baked confections such as biscuits, cookies, crackers, dry breads, pretzel wafers, sables, langue de chas, and macaroons, butter cakes (pound cakes, fruit cakes, madeleines, baumkuchens, castellas, and the like), sponge cakes (short cakes, roll cakes, tortes, decoration cakes, chiffon cakes, and the like), Western-style pastries such as choux pastries, fermented confections, pies, and waffles, and breads such as cream breads, French breads, stollens, panetones, brioches, doughnuts, danishes, and croissants.

Specifically, the confectionery product of the present application may be a baked confection. In the present application, the baked confection refers to a confectionery manufactured by baking dough, and is not limited thereto, for example, biscuits, cookies, crackers, dry breads, pretzels, wafers, pies, cut breads, shortbreads, sables, langue de chats, or macaroons.

Advantageous Effects

When a dough composition for confectionery according to the present invention is used, physical properties of dough, such as binding force and stretchiness, may be improved even without starch and gluten. In addition, a confectionery product having a high content of protein and a dietary fiber may be provided, and a confectionery product according to the present invention has as excellent sensory properties as a confectionery product using wheat flour, in terms of shape retention and texture.

The effect of the present application are not limited to the above-mentioned effects, and other effects that are not mentioned may be apparent to those skilled in the art from the following description.

BRIEF DESCRIPTION OF THE DRAWINGS

FIG. 1 is a photograph showing the binding force of dough according to the type of protein and the ratio of protein and a dietary fiber;

FIG. 2 is a photograph showing the moldability of dough according to the type of protein and the ratio of protein and a dietary fiber; and FIG. 3 is a photograph showing the appearance of cookies according to the type of protein and the ratio of protein and a dietary fiber.

In FIGS. 1 to 3, Comparative Example 1 is a case in which soybean protein is not included, Comparative Example 2 is a case in which milk protein is not included, Comparative Example 3 is a case in which the content ratio of protein and a dietary fiber is 1:2, and Comparative Example 4 is a case in which the content ratio of protein and a dietary fiber is 2:3.

MODE FOR CARRYING OUT THE INVENTION

Hereinafter, the present invention will be described in more detail with reference to examples and experimental Examples. However, these examples and experimental examples are only specifically illustrative of the present invention, and the scope of the present application is not limited by these examples and experimental examples.

EXAMPLES AND COMPARATIVE EXAMPLES

Preparation of Dough Composition for Confectionery

In order to compare the properties of dough according to the addition ratio of protein and a dietary fiber and the properties of dough according to the type of protein, milk protein, egg protein, soybean protein, and a dietary fiber were weighed according to blending ratios shown in [Table 1], and then uniformly mixed to prepare dough compositions for confectionery.

TABLE 1

| Classification | Milk protein[1] | Eggs[2] | Soybean protein[3] | Dietary fiber[4] |
|---|---|---|---|---|
| Comparative Example 1 | 40 | 9 | 0 | 20 |
| Comparative Example 2 | 0 | 9 | 40 | 20 |
| Comparative Example 3 | 10 | 9 | 10 | 40 |
| Example 1 | 25 | 9 | 12 | 23 |
| Example 2 | 10 | 10 | 25 | 23.3 |
| Example 3 | 20 | 10 | 15 | 23.3 |
| Example 4 | 30 | 10 | 10 | 26.7 |
| Example 5 | 40 | 9 | 5 | 25 |
| Example 6 | 15 | 20 | 10 | 10 |
| Example 7 | 20 | 15 | 10 | 20 |
| Example 8 | 25 | 9 | 20 | 30 |

(Unit: parts by weight)
[1]Milk protein concentrate
[2]Eggs
[3]Soybean protein concentrate
[4]A soybean dietary fiber, indigestible maltodextrin, fructooligosaccharide, a chicory dietary fiber Preparation Example Preparation of Confectionery Product In order to prepare confectionery products, necessary ingredients were weighed according to components and blending ratios as shown in [Table 1] above, and then 15.8 parts by weight of butter and 5.0 parts by weight of sugar were added thereto and mixing was performed for the first time. Thereafter, 0.2 parts by weight of salt and 19.0 parts by weight of purified water were added thereto and mixing was performed for the second time. Thereafter, animal protein, vegetable protein, and a dietary fiber according to the components and ratios as shown in [Table 1] above were mixed therewith and mixing was performed for the third time to prepare dough. Thereafter the dough was molded and placed into an oven, and then baked for 14 minutes at 120 to 190° C. (Oven top temperature: 190° C., oven bottom temperature: 120° C.) to prepare confectionery.

Experimental Example 1

Identification of Physical Properties of Dough Material

In order to increase the moldability and viscoelasticity of gluten-free dough, various properties of the dough prepared in each of Examples and Comparative Examples were confirmed according to the type of protein and the ratio of protein to a dietary fiber.

Specifically, the physical properties for the stability, binding force, and moldability of the dough were confirmed by 10 skilled panelists, and the results are shown in [Table 2] and [FIG. 1]. The physical properties of the dough were evaluated on a 5-point scale (1 point: thick to 5 points: thin) by observing the degree of thickness or thinness of the dough, and the degree of stickiness of the dough was evaluated on a 5-point scale (1 point: very sticky to 5 points: hardly sticky) by observing the degree to which the dough sticks to a hand.

TABLE 2

| Classification | Dough physical properties | Dough stickiness |
|---|---|---|
| Comparative Example 1 | 2 | 1 |
| Comparative Example 2 | 1 | 1 |
| Comparative Example 3 | 5 | 5 |
| Example 1 | 3 | 3 |
| Example 2 | 3 | 4 |
| Example 3 | 3 | 3 |
| Example 4 | 2 | 2 |
| Example 5 | 2 | 2 |
| Example 6 | 5 | 1 |
| Example 7 | 3 | 4 |
| Example 8 | 2 | 2 |

As a result, as shown in [Table 2] and [FIG. 1] above, it was confirmed that the dough of each of Examples 1 to 8 had excellent stability, binding force, and moldability of dough compared to the dough of Comparative Example 1 which did not use vegetable protein, the dough of Comparative Example 2 which contained a minimal amount of animal protein, and the dough of Comparative Example 3 which contained a large amount of a dietary fiber compared to protein. From the result, it can be seen that when protein and a dietary fiber are blended at a specific ratio and when vegetable protein and animal protein are used at a specific ratio, the stability and moldability of dough are increased.

Experimental Example 2

Sensory Evaluation of Confectionery Product

In order to maintain the shapeability of a prepared confectionery product after baking and to improve the texture thereof, a sensory evaluation was performed on cookies prepared by the method described in Preparation Example above using the dough compositions for confectionery prepared according to various compositions of [Table 1] above.

Specifically, the appearance of a product was evaluated on a 5-point scale (1 point: bad to 5 points: good) by observing the shape and color suitability of the product with the naked eye after the product was baked in an oven, and the degree of crispiness was evaluated on a 5-point scale (1 point: soggy to 5 points: crispy) by determining whether the product was firm or crumbled when the product was chewed. The degree of moistness was evaluated on a 5-point scale (1 point: dry to 5 points: moist) by determining whether the product was swallowed without being lumped in a throat.

TABLE 3

| Classification | Appearance | Crispness | Moistness |
|---|---|---|---|
| Comparative Example 1 | 2 | 3 | 2 |
| Comparative Example 2 | 1 | 2 | 3 |
| Comparative Example 3 | 1 | 1 | 5 |
| Example 1 | 5 | 5 | 3 |
| Example 2 | 4 | 4 | 2 |
| Example 3 | 5 | 5 | 3 |
| Example 4 | 4 | 3 | 2 |
| Example 5 | 4 | 3 | 1 |
| Example 6 | 2 | 2 | 5 |
| Example 7 | 5 | 4 | 4 |
| Example 8 | 4 | 4 | 3 |

As a result, compared to the cookies according to Comparative Examples 1 to 3, the cookies of Examples 1 to 8 exhibited better sensory properties in terms of appearance, crispness, and moistness. From the result, it can be seen that when both vegetable protein and animal protein are included and when protein and a dietary fiber are mixed at a specific ratio, due to the binding force and emulsifying force of the animal protein and the stretchiness and elasticity of the vegetable protein, and due to the water retaining force of the dietary fiber, the physical properties and moldability of dough are excellent, so that the shape of a prepared confectionery product may be maintained and the texture thereof is excellent.

Experimental Example 3

Ingredient Analysis of Confectionery Product

The protein content, dietary fiber content, gluten detection, and the like were measured for the cookies prepared by the method described in Preparation Example using the dough compositions for confectionery prepared according to the compositions of each of Examples and Comparative Examples.

[Measurement of Protein Content]

Measurement machine: 2300 Kjeltec Analyzer Unit, Foss Tecator

Measurement conditions: Weigh 0.4800 to 0.5000 g of a sample to be analyzed and carbonize the sample to measure a nitrogen coefficient generated at the time.

Measurement method: Measurement by a nitrogen determination method (Nitrogen coefficient wheat flour 5.70, others 6.25)

[Measurement of Dietary Fiber]

Measurement conditions: Weigh 1 g of a sample to be analyzed and prepare two of them Measurement method: The two samples dried by removing fat therefrom are continuously decomposed with thermophile a-amylase, protease, amylase, and amyloglucosidase enzymes to remove starch and protein. Enzymatic decomposition products are filtered, and then residues thereof are washed with water and weighed to quantify a water-insoluble dietary fiber (IDF). A filtrate and a washing solution obtained from a pretreatment process of the IDF are combined, precipitated with ethanol, and then filtered, and residual substances thereof are dried and weighed to quantify a water-soluble dietary fiber (SDF). When calculating the water-insoluble and water-soluble dietary fiber contents, the amount of protein and ash in the weight of the residues are corrected.

[Measurement of Gluten]

Measurement method: Analysis using Veratox for Gliadin R5 Allergen. Neogen No. 8510 kit Measurement conditions: 150 µl of an extracted sample is placed into the kit, and an antigen-antibody reaction is induced to analyze absorbance so as to measure the content of gluten.

Measurement method: Measurement by a colorimetric method

TABLE 4

| Classification | Carbohydrate (g/100 g) | Sugars (mg/.100 g) | Crude protein (g/100 g) | Total dietary fiber (g/100 g) | Gluten (mg/100 g) |
|---|---|---|---|---|---|
| Comparative Example 3 | 38.52 | 89.50 | 14 | 47 | N.D. |
| Example 1 | 42.64 | 102.41 | 27.7 | 31.69 | N.D. |

As a result, as shown in [Table 4], it was confirmed that the cookies prepared according the compositions of Example 1 had significantly high contents of protein and a dietary fiber, and no gluten was detected therefrom. In the above, preferred examples, comparative examples, and experimental examples of the present application have been exemplarily described, but the scope of the present application is not limited to the specific examples, comparative examples and experimental examples described above. Those of ordinary skill in the art will understand that the scope of the present application may be appropriately changed within the scope described in the claims of the present application.

The invention claimed is:

1. A dough composition for baked confectionery comprising:
    vegetable protein including soy protein;
    animal protein including milk protein and egg protein; and
    a dietary fiber,
    wherein the content of total protein including the vegetable protein and the animal protein is 150 to 300 parts by weight based on 100 parts by weight of the dietary fiber,
    wherein a content of the vegetable protein is 10 to 150 parts by weight based on 100 parts by weight of the dietary fiber,
    wherein a content of the animal protein is 20 to 100 parts by weight based on 100 parts by weight of the total protein,
    wherein a content of the dietary fiber is 10 to 50 parts by weight based on 100parts by weight of the dough composition, and
    wherein the dough composition does not comprise gluten or wheat flour.

2. The dough composition of claim 1, wherein the content of the vegetable protein is 10 to 80 parts by weight based on 100 parts by weight of the total protein.

3. The dough composition of claim 1, wherein the dietary fiber comprises a water-soluble dietary fiber and an insoluble dietary fiber.

4. The dough composition of claim 1, wherein the dietary fiber is one or more selected from the group consisting of a chicory dietary fiber, fructooligosaccharide, indigestible maltodextrin, polydextrose, galactooligosaccharide, a soybean dietary fiber, a prune dietary fiber, a rice dietary fiber, and an oat dietary fiber.

5. The dough composition of claim 1, wherein the dough composition for confectionery comprises 3 to 40 parts by weight of the soy protein, 5 to 50 parts by weight of the milk protein, and 1 to 5 parts by weight of the egg protein based on 100 parts by weight of the dough composition for confectionery.

6. A method for producing a confectionery product, the method comprising:
    kneading dough with the dough composition for confectionery of claim 1; and baking the dough.

7. The method of claim 6, wherein the dough is baked at a temperature of 140 to 230° C. for 10 to 40 minutes.

8. The method of claim 6, wherein the dough is kneaded by mixing the dough composition.

9. The method of claim 6, wherein the baking is performed at 140 to 230° C. for 10 to 40 minutes.

10. A confectionery product comprising:
    15g/100g to 40g/100g of crude protein;
    10g/100g to 40g/100g of a dietary fiber; and
    vegetable protein including soy protein, and animal protein including milk protein and egg protein;
    wherein the confectionery product does not comprise gluten, or the content of gluten in the confectionery product is 0.5 mg/100g or less,
    wherein the confectionery product is prepared from the dough composition of claim 1.

11. The confectionery product of claim 10, wherein the confectionery product comprises 20 g/100 g to 50 g/100 g of carbohydrate and 3 g/100 g to 20 g/100 g of sugars.

12. The confectionery product of claim 10, wherein the confectionery product is one or more kinds of baked confections selected from the group consisting of biscuits, cookies, crackers, dry breads, pretzels, wafers, pies, cut breads, shortbreads, sables, langue de chats, and macaroons.

* * * * *